United States Patent
Lange

[11] Patent Number: 5,934,753
[45] Date of Patent: Aug. 10, 1999

[54] CAM ASSEMBLY FOR DETACHABLY LOCKING A STRUCTURAL MEMBER ESPECIALLY ON A MOTOR VEHICLE SEAT

[75] Inventor: Dieter Lange, Petershagen, Germany

[73] Assignee: Bertrand Faure Sitztechnik GmbH & Co. KG, Stadthagen, Germany

[21] Appl. No.: 08/987,598

[22] Filed: Dec. 9, 1997

[30] Foreign Application Priority Data

Dec. 27, 1996 [DE] Germany ............................ 196 54 395

[51] Int. Cl.⁶ ..................................................... B60N 2/22
[52] U.S. Cl. ............................... 297/367; 74/529; 74/533; 16/325
[58] Field of Search ............................ 297/367; 74/529, 74/533, 534; 16/325, 334, 344

[56] References Cited

U.S. PATENT DOCUMENTS

| 4,076,309 | 2/1978 | Chekirda et al. | 297/367 X |
| 4,082,352 | 4/1978 | Dales et al. | 297/367 X |
| 4,223,947 | 9/1980 | Cremer | 297/367 |
| 4,295,682 | 10/1981 | Kluting et al. | 297/367 |
| 4,357,050 | 11/1982 | Fisher, III | 297/367 |
| 4,523,786 | 6/1985 | Letourneux et al. | 297/367 X |
| 4,591,207 | 5/1986 | Nithammer et al. | 297/367 X |
| 5,393,116 | 2/1995 | Balsworth et al. | 297/367 X |
| 5,558,403 | 9/1996 | Hammeud et al. | 297/367 X |
| 5,718,481 | 2/1998 | Roinson | 297/367 |

FOREIGN PATENT DOCUMENTS

4417491A1 11/1995 Germany .

Primary Examiner—Peter M. Cuomo
Assistant Examiner—Rodney B. Wite
Attorney, Agent, or Firm—Flanagan & Flanagan; John R. Flanagan; John K. Flanagan

[57] ABSTRACT

A cam assembly for detachably locking a structural member includes a pivot axle, a cam body having a locking cam surface adapted to make locking contact with the structural member and a curved surface comprising a circular arc segment and another segment offset from the arc segment, a locking latch pivotably movable relative to the pivot axle and cam body between locked and unlocked positions and having a contact surface facing the curved surface of the cam body, and a roller disposed between the contact surface of the locking latch and curved surface of the cam body. The roller is supported on the circular arc segment of the curved surface when the locking latch is held in the locked position such that the distance between the pivot axle and curved surface is filled by the locking latch and roller and play is eliminated between the cam body and pivot axle causing the locking surface of the cam body to make locking contact with the structural member and hold the cam assembly in a self-locking state. The roller is movable from the circular arc segment onto the offset segment of the curved surface in response to pivoting of the locking latch from the locked position to the unlocked position such that the distance between the pivot axle and curved surface is not filled by the locking latch and roller and play is introduced between the cam body and pivot axle allowing the cam body to displace relative to the pivot axle and move away from locking contact with the structural member and thereby detach the cam assembly from the self-locking state.

18 Claims, 3 Drawing Sheets

CAM ASSEMBLY FOR DETACHABLY LOCKING A STRUCTURAL MEMBER ESPECIALLY ON A MOTOR VEHICLE SEAT

BACKGROUND OF THE INVENTION

1. Field of the Invention

The present invention relates to a self-locking cam for detachably locking a structural member, especially on a motor vehicle seat, and more particularly is concerned with a cam assembly including a stationary pivot axle, a cam body supported on the pivot axle, and a biased locking latch and roller associated with the cam body and pivot axle such that a locking surface of the cam body, when the locking latch and roller are in a locked position, is retained in contact with the structural member so as to hold the cam assembly in a self-locking state.

2. Description of the Prior Art

A cam of a self-locking type is known for example from German patent document No. DE 44 17 491 A1. This document describes a capture hook with a configuration adapted for a foldable backrest foldably articulated on the seat part of a motor vehicle seat. The capture hook with this configuration is intended to prevent the backrest from unintentionally folding forward during strong negative acceleration such as occurs for example in the event of a crash. The self-locking cam is provided for securement of the capture hook in a locking position. When the capture hook is in the locking position, this cam has a rising locking surface in contact on a pressure surface of the capture hook such that the cam is self-locking.

The self-locking cam is connected with a detachment member, for example a Bowden cable, with the aid of which the cam can be pivoted about the pivot axis should the backrest be folded forward. The actuation forces for detaching the cam from the pressure surface of the capture hook depend on the strength of the self-locking developed between the locking surface of the cam and the pressure surface of the capture hook. Maximum self-locking strength is desirable in order to have large holding forces for the capture hook to be secured. This applies to all structural members to be secured or locked with a cam of the self-locking type. However, it is therein true that the greater the holding forces produced from the self-locking the greater the actuation forces required for detaching the cam. According to the prior art, for example also in the construction disclosed in the above-cited German patent document No. DE 44 17 491 A1, as a compromise the self-locking strength is therefore selected in which the actuation forces for detaching the cam can be supplied without any problems by persons of normal physical strength.

SUMMARY OF THE INVENTION

The present invention provides a cam assembly of the self-locking type which by having the construction disclosed herein is readily detachable in spite of comparatively large holding forces produced from the self-locking of the cam. In the construction of the cam assembly of the present invention, application of relatively smaller forces are sufficient to overcome the rolling resistance and pre-stress or biasing forces of components of the cam in order to cancel the self-locking state thereof, in comparison to application of relatively higher forces required in the cams known from prior art in order to overcome sliding friction between the cam locking surface and the structural member to be locked.

Accordingly, the present invention is directed to a cam assembly for the detachable locking of a structural member. The cam assembly comprises a pivot axle, a cam body having a locking cam surface adapted to make locking contact with the structural member and a curved surface comprising a circular arc segment and another segment offset from the arc segment, a locking latch pivotably movable relative to the pivot axle and cam body between locked and unlocked positions and having a contact surface facing the curved surface of the cam body, and a roller disposed between the contact surface of the locking latch and curved surface of the cam body. The roller is supported on the circular arc segment of the curved surface when the locking latch is held in the locked position such that the distance between the pivot axle and curved surface is filled by the locking latch and roller and play is eliminated between the cam body and pivot axle causing the locking surface of the cam body to make locking contact with the structural member and hold the cam assembly in a self-locking state. The roller is movable from the circular arc segment onto the offset segment of the curved surface in response to pivoting of the locking latch from the locked position to the unlocked position such that the distance between the pivot axle and curved surface is not filled by the locking latch and roller and play is introduced between the cam body and pivot axle allowing the cam body to displace relative to the pivot axle and move away from locking contact with the structural member and thereby detach the cam assembly from the self-locking state.

The locking latch and roller of the cam assembly in conjunction with the cam body and pivot axle thus have a locked position and an unlocked position. In the locked position, a state is brought about in which the cam assembly can be pivoted without play about the pivot axle. This is attained by the distance within the cam body between the center point of the pivot axle and the curved surface of the cam body being filled by the locking latch and roller and thus free of play. In such locked position, the locking surface on the cam body has a fixed positional relation to the center point of the pivot axle and to the structural member to be locked such that pivoting of the cam body into its locked position leads to a self-locking state.

If the locking latch is pivoted into the detached or unlocked position under the action of a detachment member, the distance between the center point of the pivot axle and the curved surface is no longer filled by the locking latch and roller and so play is introduced. The degree of play which exists corresponds to the width of an offset ledge in the curved surface. The cam body is not radially displaceable on the pivot axle until the roller passes the offset ledge whereby the locking latch and roller and thereby the cam assembly is abruptly released from the self-locking state and the locking of the structural member is detached.

Immediately after the unlocking of the structural member the pre-stress locking latch is pressed again into the locked position, i.e. the play is removed, and the cam assembly is ready for the next locking process.

In the cam assembly of the present invention only rolling resistance of the roller and pre-stress or biasing forces on the locking latch must be overcome in order to relieve the self-locking state of the cam assembly. For this to occur the application of relatively small forces are sufficient in comparison with the self-locking cams known from prior art in which sliding friction directly between the locking surface of the cam and the structural member to be locked must be overcome.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
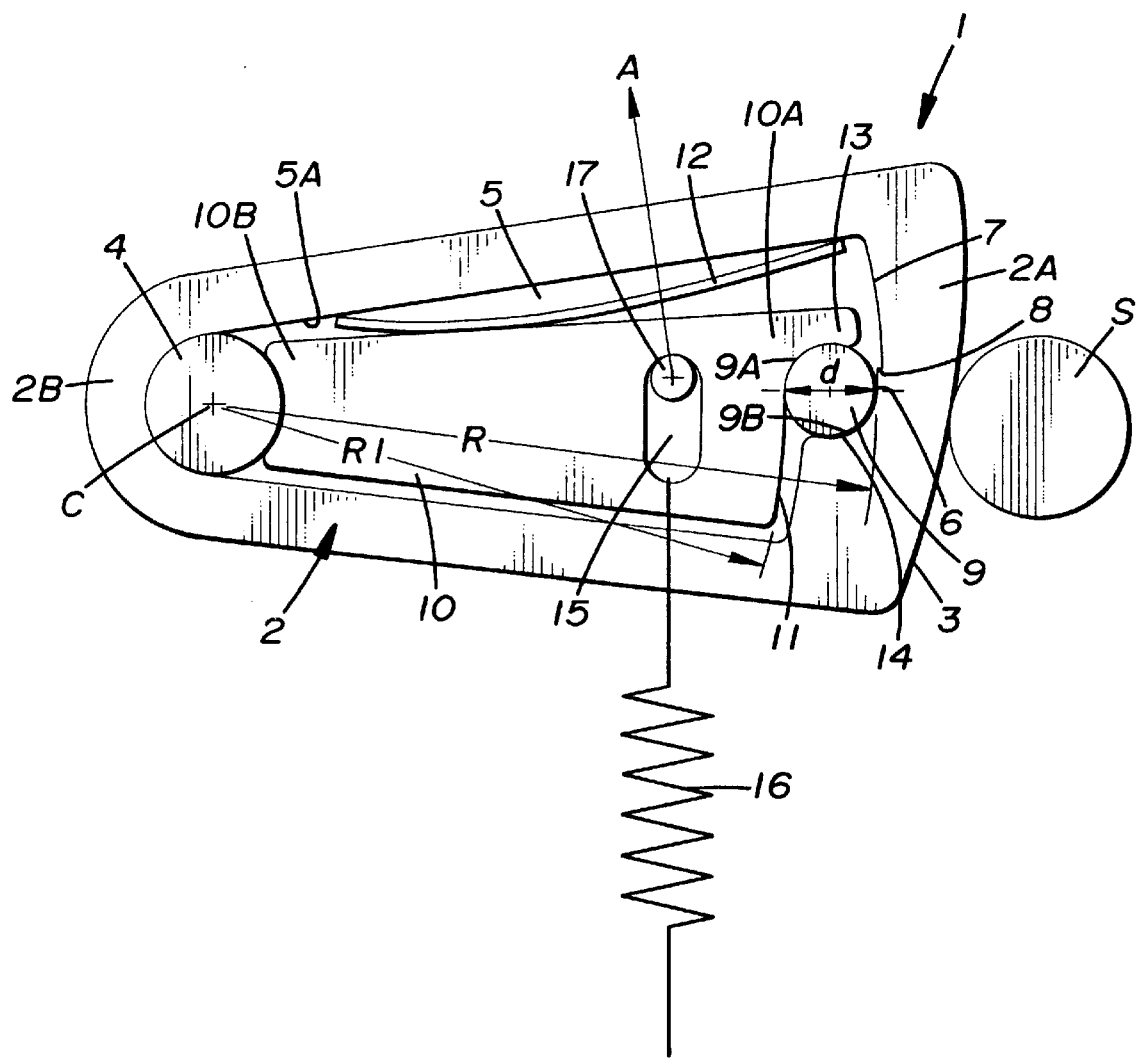
FIG. 1 is a side elevational view of a cam assembly of the present invention in a locked position relative to a structural member.

Referring to the drawings and particularly to FIG. 1, there is illustrated a cam assembly of the present invention, generally designated 1, in contact on any structural member S to be locked. The cam assembly 1 basically includes a hollow cam body 2 having at one end 2A an exterior locking cam surface 3, implemented as an inclined curve, and a stationary pivot axle 4 such that when the cam assembly 1 is pivoted about the pivot axle 4 into a locked position shown in FIG. 1, the pivot axle 4 and the structural member S, whose spacing stays the same, are braced relative to one another, producing a self-locking state of the cam assembly 1.

The hollow cam body 2 of the cam assembly 1 is generally wedge-shaped and has a window 5 defined by an interior continuous boundary surface 5A formed therewithin. Adjacent to an opposite end 2B of the cam body 2 opposite from the structural member S and the one body end 2A, the pivot axle 4 extends through the window 5 and is stationarily supported independently of the cam assembly 1 by any suitable means (not shown). Because the shape of the periphery of the pivot axle 4 is complementary to the shape of an end portion of the window boundary surface 5A adjacent to the opposite body end 2A, when the cam assembly 1 is at the locked position, which will be further described hereinafter, the pivot axle 4 snugly fits through the window 5 of the cam assembly 1 at the opposite body end 2B thereof with a portion of the periphery of the pivot axle 4 in contact on the adjacent end portion of the boundary surface 5A of the window 5. Absent the components of the cam assembly 1 depicted in FIG. 1 being disposed within the window 5 in the cam body 2, which components will be further described hereinafter, the cam assembly 1 is freely displaceable relative to the pivot axle 4 and toward and away from the structural member S.

Opposing the pivot axle 4 at the one body end 2A of the cam assembly 1 is an opposite end portion of the boundary surface 5A of the window 5 implemented as a curved surface. More particularly, this curved surface is defined by a short segment 6 and a somewhat longer segment 7 of the opposite end portion of the window boundary surface 5A. The longer surface segment 7 is offset from the short surface segment 6 in the direction of the exterior locking cam surface 3 on the one body end 2A of the cam assembly 1 by the width of an offsetting interior ledge 8 included on the window boundary surface 5A. The short surface segment 6 is provided as an arc of a circle and has a spacing or radius R from a pivotal center point C of the pivot axle 4. It is useful if the longer surface segment 7 is also provided as a circular arc about the center C of the pivot axle 4 with a radius which is longer than the radius R by the width of the offsetting ledge 8.

Disposed within the window 5 of its cam body 2, the cam assembly 1 also includes a roller 9 of spherical shape, a rigid locking latch 10 having a contact surface 11 on an outer end 10A providing a first abutment having a curved shape complementary to the roller 9 to receive and engage a first circumferential portion 9A thereof, and biasing means in the form of a leaf spring 12 disposed between the locking latch 10 and a side portion of the window boundary surface 5. On its opposite end from the longer segment 7, the short segment 6 terminates in an arcuate-shaped shoulder 14 which provides a second abutment having a curved shape complemenary to the roller 9 to receive and engage a second circumferential portion 9B thereof. The locking latch 10 at an inner end 10B thereof has a recess of curved shape complementary to the circumference of the pivot axle 4 such that the locking latch 10 is supported thereon and pivotable thereabout. The contact surface 11 on the outer end 10A of the locking latch 10 providing the first abutment for the roller 9 is disposed on an arc with radius $R_1$ about the center C of the pivot axle 4. Radius $R_1$ is shorter by the diameter "d" of roller 9 than radius R of the arc defining the short segment 6 on the opposite end portion of the window boundary surface 5A, such that $R=R_1+d$.

Figure 2:
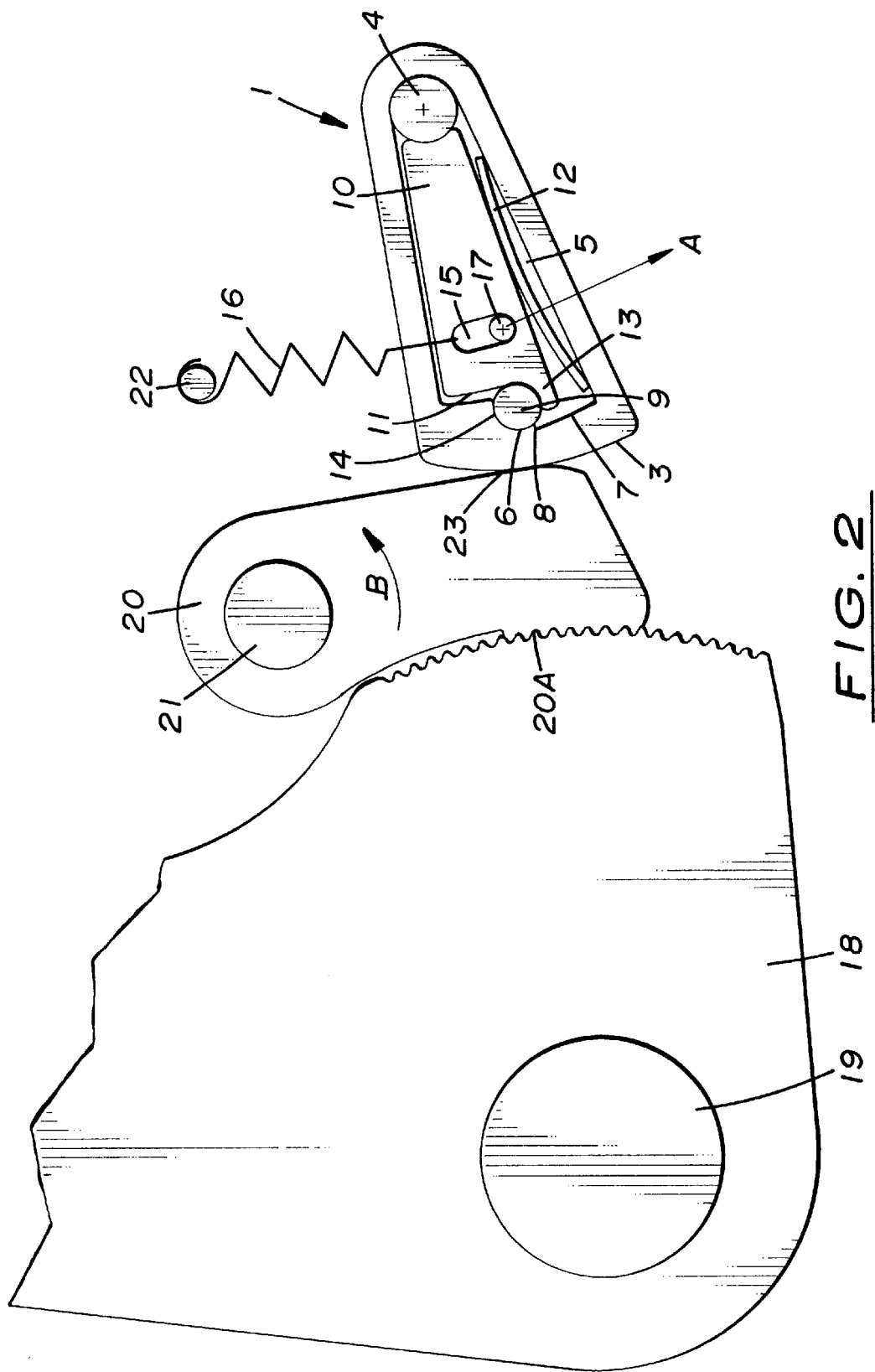
FIG. 2 is a side elevational view of the cam assembly of FIG. 1 applied as a locking cam assembly for a catch pawl of a locking latch fitting for a tilt adjustment of a backrest of a motor vehicle seat, with the locking cam assembly and catch pawl in a locked position.
Figure 3:
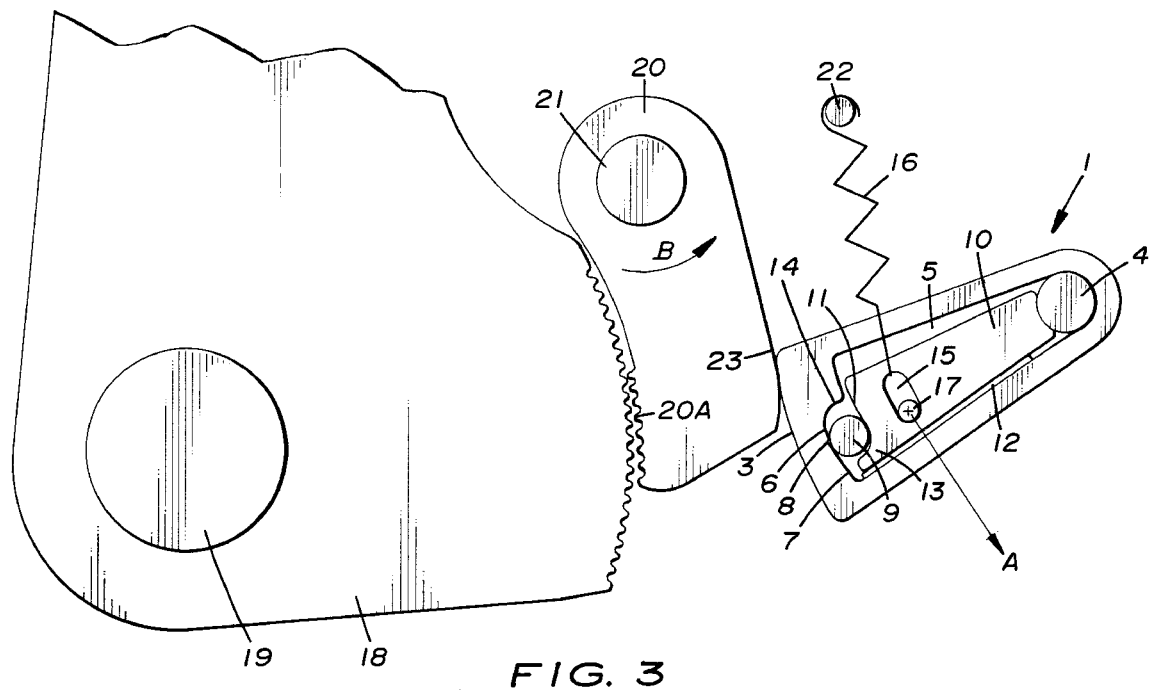
FIG. 3 is a side elevational view similar to FIG. 2 but with the locking cam assembly and catch pawl in an unlocked position.

In the locked position of the cam assembly 1 and thus of the locking latch 10 thereof as shown in FIGS. 1 and 2, the cam assembly 1 is comparable with a windowless cam having a bore with a diameter similar to that of the pivot axle 4 through which the pivot axle 4 extends to pivotally support such windowless cam thereon. The locking latch 10 is pressed into such locked position by the leaf spring 12 which is emplaced between the locking latch 10 and the one side portion of the boundary surface 5A of the window 5 disposed across the path of movement of the locking latch 10 toward an unlocked position, as seen in FIG. 3. In the locked position shown in FIGS. 1 and 2, the roller 9 is retained free of play between and in contact with the first abutment defined on a nose 13 of the locking latch 10 and the second abutment defined by the shoulder 14 on the window boundary surface SA with both partially encompassing the circumference of the roller 9, and between and in contact with the arc-shaped contact surface 11 on the outer end 10A of the locking latch 10 and the short segment 6 of the window boundary surface 5A on the hollow cam body 2.

In addition to the biasing force provided by the leaf spring 12, a tension spring 16 can be suspended from a longitudinal hole 15 defined in the locking latch 10 so as to assist in retaining the locking latch 10 and therewith also the roller 9 in the above-described locked position. The tension spring 16 serves simultaneously for pulling the cam assembly 1 into its locked position and thereby self-locking state with the structural member S.

If the self-locking state between the cam assembly 1 and the structural member S is to be removed, and thus if the structural member S is to be unlocked, the locking latch 10 must be actuated in the direction of arrow A. For this purpose a member such as a bolt 17 is attached, such as by being welded, into the longitudinal hole 15 of the locking latch 10 to which is coupled and suspended, for example, a Bowden cable (not shown). The actuating force applied by the Bowden cable for moving the locking latch 10 to the unlocked position of FIG. 3, must overcome the rolling friction between the roller 9 and its contact surfaces 6 and 11 as well as the pre-stressed or biasing forces of springs 12 and 16. After rolling only a short distance, the roller 9 rolls off the surfaces 11 and 6 and onto the segment 7 of the curve path such that play is introduced into the spacing between each individual point of the exterior locking surface 3 of the cam body 2 and the center C of the pivot axle 4 whereby the self-locking state of the cam assembly 1 is abruptly cancelled and the cam assembly 1 can then in principle be pivoted force-free.

The application example depicted in FIGS. 2 and 3 for the cam assembly 1 of the present invention relates to the locking of a tilt-adjustable backrest of a motor vehicle seat against unintentional pivoting, especially in the event of a crash. The backrest and the seat part of the motor vehicle seat which are well-known are not shown. A tooth segment 18 is provided stationary on the backrest which is pivotable about an axis 19. The tooth segment 18 is engaged by a locking pawl 20, which is provided with a corresponding tooth sector 20A. The locking pawl 20 is pivotably supported on an axle 21 stationary on the seat and is under pre-stress in the direction of arrow B under the action of a spring (not shown). In order to ensure the secure latching of the tooth sector 20A of the blocking pawl 20 with the tooth segment 18, even in the event of a crash, the cam assembly 1 of the present invention is provided having the construction described above with reference to FIG. 1. The pivot axle 4 of the cam assembly 1 is secured stationarily on the seat and the tension spring 16 is suspended on a seat-stationary pin 22.

In the locked position depicted in FIG. 2 the cam assembly 1 is in a self-locking state in contact with a pressure surface 23 of the locking pawl 20, whose tooth sector 20A is thus firmly pressed into and lockably meshed with the tooth segment 18. If the backrest is to be tilt-adjusted the locking latch 10 of the cam assembly 1 is pivoted in the direction of arrow A through actuation of a Bowden cable or lever (not shown). The locking latch 10 is thereby transferred into its unlocked or detached position shown in FIG. 3. The self-locking state of the cam assembly 1 is cancelled and the locking pawl 20 can pivot out of engagement with the tooth segment 18. In the situation shown in FIG. 3 the locking pawl 20 has already somewhat lifted off the tooth segment 18 and cam assembly 1 is pivoted a little further in the direction of arrow A. The connection between cam assembly 1 and the locking pawl 20 is in principle force-free. In this situation the locking latch 10 is immediately, under the action of the leaf spring 12 and the tension spring 16, pressed or pulled into the locked position again whereby cam assembly 1 is ready for the next locking process. If now, after the tilt adjustment of the backrest has been completed, the actuation of the Bowden cable or lever is released, the tension spring 16 will pull the cam assembly 1 again into the self-locking state and the locking pawl 20 is again secured on the tooth segment 18.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A cam assembly for detachably locking a structural member, said cam assembly comprising:

(a) a pivot axle;
(b) a cam body having a locking cam surface adapted to make locking contact with a structural member, said cam body having opposite side portions and defining an interior curved surface located a given distance from said pivot axle and comprising a circular arc segment with a radius about said pivot axle and another segment offset from said arc segment;
(c) a locking latch pivotably movable relative to said pivot axle and cam body between a locked position and an unlocked position, said locking latch having opposite sides and a contact surface facing said curved surface of said cam body; and
(d) a roller disposed between said contact surface of said locking latch and said curved surface of said cam body, said roller being supported on said circular arc segment of said curved surface when said locking latch is held in said locked position such that the distance between said pivot axle and curved surface is filled by said locking latch and roller and play is eliminated between said cam body and pivot axle causing said locking surface of said cam body to make locking contact with the structural member and hold said cam assembly in a self-locking state, said roller being movable from said circular arc segment of said curved surface onto said offset segment thereof in response to pivoting of said locking latch from said locked position to said unlocked position such that a portion of the distance between said pivot axle and curved surface is free of said locking latch and roller and play is introduced between said cam body and pivot axle allowing said cam body to displace relative to said pivot axle and move away from locking contact with the structural member and thereby detach said cam assembly from said self-locking state.

2. The cam assembly of claim 1 wherein said cam body forms a window receiving said pivot axle therethrough, said window being defined by an interior window boundary surface having one end portion borne on a circumference of said pivot axle and an opposite end portion implemented as said interior curved surface of said cam body, said locking latch and roller being disposed within said window between said pivot axle and said opposite end portion of said cam body.

3. The cam assembly of claim 2 wherein said locking latch is disposed within said window of said cam body with sufficient lateral play between opposite sides of said locking latch and opposite side portions of said cam body to permit pivoting of said locking latch relative to said pivot axle and cam body.

4. The cam assembly of claim 3 further comprising:
a leaf spring disposed between said locking latch and one of opposite side portions of said cam body so as to pre-stress said locking latch to pivotally move toward said locked position.

5. The cam assembly of claim 2 wherein said contact surface of said locking latch is disposed on a circular arc having a radius which is shorter by a diameter of said roller than the radius of said curved segment of said interior curved surface on said cam body.

6. The cam assembly of claim 2 wherein said locking latch has a nose at one end pointing toward said interior curved surface of said cam body which partially encompasses said roller and confines said roller between said locking latch and said interior curved surface of said cam body.

7. The cam assembly of claim 1 further comprising:
a tension spring connected to said locking latch and adapted to pre-stress said locking latch toward said locked position and said cam body in in a locking direction with respect to the structural member.

8. The cam assembly of claim 1 further comprising:

a spring disposed between said cam body and locking latch pre-stressing said locking latch to pivotally move to said locked position.

9. The cam assembly of claim 8 further comprising:

a tension spring connected to said locking latch and adapted to also pre-stress said locking latch toward said locked position and said cam body in a locking direction with respect to the structural member.

10. A cam assembly for detachably locking a structural member, said cam assembly comprising:

(a) a pivot axle;

(b) a hollow cam body having an exterior locking cam surface adapted to make locking contact with a structural member, said hollow cam body having opposite side portions and defining an interior curved surface located a given distance from said pivot axle and comprising a circular arc segment with a radius about said pivot axle and another segment offset from said arc segment;

(c) a locking latch disposed within said hollow cam body and pivotable relative to said pivot axle and cam body between a locked position and an unlocked position, said locking latch having opposite sides and a contact surface facing said curve surface of said cam body; and (d) a roller disposed within said hollow cam body between said contact surface of said locking latch and said interior curved surface of said cam body, said roller being supported on said circular arc segment of said curved surface of said cam body when said locking latch is held in said locked position such that the distance between said pivot axle and interior curved surface of said cam body is filled by said locking latch and roller and play is eliminated between said cam body and pivot axle causing said exterior locking surface of said cam body to make locking contact with the structural member and hold said cam assembly in a self-locking state, said roller being movable from said circular arc segment of said curved surface of said cam body onto said offset segment thereof in response to pivoting of said locking latch from said locked position to said unlocked position such that a portion of the distance between said pivot axle and interior curved surface of said cam body is free of said locking latch and roller and play is introduced between said cam body and pivot axle allowing said cam body to displace relative to said pivot axle and move from locking contact with the structural member and thereby detach said cam assembly from said self-locking state.

11. The cam assembly of claim 10 wherein said hollow cam body forms a window receiving said pivot axle therethrough, said window being defined by an interior window boundary surface having one end portion borne on a circumference of said pivot axle and an opposite end portion implemented as said interior curved surface of said cam body, said locking latch and roller being disposed within said window between said pivot axle and said opposite end portion of said cam body.

12. The cam assembly of claim 11 wherein said locking latch is disposed within said window of said cam body with sufficient lateral play between opposite sides of said locking latch and opposite side portions of said cam body to permit pivoting of said locking latch relative to said pivot axle and cam body.

13. The cam assembly of claim 12 further comprising:

a leaf spring disposed within said window between said locking latch and one of opposite side portions of said cam body so as to pre-stress said locking latch to pivotally move toward said locked position.

14. The cam assembly of claim 11 wherein said contact surface of said locking latch is disposed on a circular arc having a radius which is shorter by a diameter of said roller than the radius of said curved segment of said interior curved surface on said cam body.

15. The cam assembly of claim 11 wherein said locking latch has a nose at one end pointing toward said interior curved surface of said cam body which partially encompasses said roller and confines said roller between said locking latch and said interior curved surface of said cam body.

16. The cam assembly of claim 10 further comprising:

a tension spring connected to said locking latch and adapted to pre-stress said locking latch toward said locked position and said cam body in in a locking direction with respect to the structural member.

17. The cam assembly of claim 10 further comprising:

a spring disposed within said hollow cam body between said cam body and locking latch pre-stressing said locking latch to pivotally move to said locked position.

18. The cam assembly of claim 17 further comprising:

a tension spring connected to said locking latch and adapted to also pre-stress said locking latch toward said locked position and said cam body in a locking direction with respect to the structural member.

* * * * *